United States Patent
Park et al.

(10) Patent No.: US 12,535,354 B2
(45) Date of Patent: Jan. 27, 2026

(54) APPARATUS AND METHOD FOR SOUND ANOMALY DETECTION BASED ON NON-COMPRESSION CONVOLUTIONAL NEURAL NETWORK

(71) Applicant: SK Planet Co., Ltd., Seongnam-si (KR)

(72) Inventors: Yeonghyeon Park, Suwon-si (KR); Jong Hee Jung, Yongin-si (KR)

(73) Assignee: SK Planet Co., Ltd., Seongnam-si (KR)

(*) Notice: Subject to any disclaimer, the term of this patent is extended or adjusted under 35 U.S.C. 154(b) by 333 days.

(21) Appl. No.: 18/350,770

(22) Filed: Jul. 12, 2023

(65) Prior Publication Data
US 2023/0349752 A1    Nov. 2, 2023

Related U.S. Application Data

(63) Continuation of application No. PCT/KR2021/007661, filed on Jun. 18, 2021.

(30) Foreign Application Priority Data

Mar. 11, 2021    (KR) .................. 10-2021-0032109

(51) Int. Cl.
| | |
|---|---|
| *G06F 11/00* | (2006.01) |
| *G01H 17/00* | (2006.01) |
| *G06N 3/08* | (2023.01) |

(52) U.S. Cl.
CPC ............... *G01H 17/00* (2013.01); *G06N 3/08* (2013.01)

(58) Field of Classification Search
CPC .................................. G01H 17/00; G06N 3/08
(Continued)

(56) References Cited

U.S. PATENT DOCUMENTS 8,484,022 B1 * 7/2013 Vanhoucke ............ G06N 3/045
    700/48
10,794,543 B2 * 10/2020 Yeung .................. H10H 20/857
(Continued)

FOREIGN PATENT DOCUMENTS

| KR | 10-2017-0119353 A | 10/2017 |
| KR | 10-2027389 B1 | 10/2019 |

(Continued)

OTHER PUBLICATIONS

PCT International Search Report and Written Opinion, PCT Application No. PCT/KR2021/007661, Nov. 30, 2021, 13 pages.
(Continued)

*Primary Examiner* — William J Deane, Jr.
(74) *Attorney, Agent, or Firm* — WTA IP Law P.C.

(57) ABSTRACT

According to the present invention, a sound anomaly detection method includes acquiring, by an audio unit, a noise from an inspection target; generating, by a data processing unit, an input value that is a feature vector matrix including a plurality of feature vectors from the noise; generating, by a detection unit, a restored value imitating the input value through a detection neural network that is a deep neural network learned for the input value; determining, by the detection unit, whether a restoration error indicating a difference between the input value and the restored value is greater than or equal to a calculated reference value; and determining, by the detection unit, that there is an anomaly in the inspection target when determining that the restoration error is greater than or equal to the reference value.

8 Claims, 7 Drawing Sheets

(58) Field of Classification Search
USPC .......................................................... 381/56
See application file for complete search history.

(56) References Cited

U.S. PATENT DOCUMENTS

| | | | |
|---|---|---|---|
| 11,062,458 B2* | 7/2021 | Yokoyama | G06N 3/084 |
| 11,615,343 B2* | 3/2023 | Ikeda | G06F 18/217 |
| | | | 382/156 |
| 2021/0327456 A1* | 10/2021 | Yamaguchi | G10L 25/30 |

FOREIGN PATENT DOCUMENTS

| | | |
|---|---|---|
| KR | 10-2019-0139126 A | 12/2019 |
| KR | 10-2020-0109904 A | 9/2020 |

OTHER PUBLICATIONS

Son, J-H. et al. "Detection of Abnormal Vessel Trajectories with Convolutional Autoencoder." Journal of the Society of Korea Industrial and Systems Engineering, vol. 43, No. 4, Dec. 2020, pp. 190-197, (with English abstract).

* cited by examiner

APPARATUS AND METHOD FOR SOUND ANOMALY DETECTION BASED ON NON-COMPRESSION CONVOLUTIONAL NEURAL NETWORK

CROSS REFERENCE TO RELATED APPLICATIONS

This is a bypass continuation application of International PCT application No. PCT/KR2021/007661, filed on Jun. 18, 2021, which claims priority to Republic of Korea patent application No. 10-2021-0032109, filed on Mar. 11, 2021, which are incorporated by reference herein in their entirety.

TECHNICAL FIELD

The present invention relates to a sound anomaly detection technology, and more particularly, to a sound anomaly detection apparatus and method based on a non-compression convolutional neural network.

BACKGROUND

Typically, an anomaly detection function is provided to a user in the form of manufacturing a specific product to include an anomaly detection device. For example, in case of road surface anomaly detection, a camera, an infrared sensor, a laser, etc. are directly mounted on a vehicle and provided in the form of an advanced driver assistance system (ADAS). For example, in home appliances, it is provided in the form of equipping a temperature sensor to detect abnormalities in a refrigerator. In case of typical technologies, there is a limitation in that it is difficult to detect anomalies in an old product unless a new product is purchased because the old product is distributed without the corresponding functions.

SUMMARY

The present invention is intended to provide a sound anomaly detection apparatus and method based on a non-compression convolutional neural network.

According to embodiments of the present invention, a sound anomaly detection method includes acquiring, by an audio unit, a noise from an inspection target; generating, by a data processing unit, an input value that is a feature vector matrix including a plurality of feature vectors from the noise; generating, by a detection unit, a restored value imitating the input value through a detection neural network that is a deep neural network learned for the input value; determining, by the detection unit, whether a restoration error indicating a difference between the input value and the restored value is greater than or equal to a calculated reference value; and determining, by the detection unit, that there is an anomaly in the inspection target when determining that the restoration error is greater than or equal to the reference value.

In the method, generating the restored value may include calculating, by an encoder of the detection neural network, a latent value from the input value without dimension reduction; and calculating, by a decoder of the detection neural network, the restored value from the latent value without dimension expansion.

The method may further include, before acquiring the noise from the inspection target, initializing, by a learning unit, the detection neural network; inputting, by the learning unit, a training input value to the initialized detection neural network; calculating, by an encoder of the detection neural network, an uncompressed latent value from the training input value; calculating, by a decoder of the detection neural network, the restored value from the latent value; calculating, by the learning unit, a loss that is a difference between the restored value and the training input value; and performing, by the learning unit, optimization of updating a parameter of the detection neural network to minimize the loss.

The method may further include, before acquiring the noise from the inspection target, and after completing learning on the detection neural network, calculating, by the detection unit, the reference value in accordance with Equation $\theta=\mu+(k\times\sigma)$, wherein $\mu$ denotes an average of a mean squared error (MSE) between a plurality of training input values and a plurality of restored values corresponding to the plurality of training input values used for learning on the detection neural network, wherein $\sigma$ denotes a standard deviation of the MSE between the plurality of training input values and the plurality of restored values corresponding to the plurality of training input values, and wherein k is a weight for the standard deviation.

In the method, generating the input value may include extracting, by the data processing unit, a plurality of mel-spectrograms by applying a sliding window having a predetermined time length to the noise; generating, by the data processing unit, a plurality of feature vectors by compressing each of the plurality of mel-spectrograms with mel-frequency cepstral coefficient (MFCC) according to a time average; and generating, by the data processing unit, the input value by combining the plurality of feature vectors into a feature vector matrix.

According to embodiments of the present invention, a sound anomaly detection apparatus may include an audio unit configured to acquire a noise from an inspection target; a data processing unit configured to generate an input value that is a feature vector matrix including a plurality of feature vectors from the noise; and a detection unit configured to generate a restored value imitating the input value through a detection neural network that is a deep neural network learned for the input value, to determine whether a restoration error indicating a difference between the input value and the restored value is greater than or equal to a calculated reference value, and to determine that there is an anomaly in the inspection target when determining that the restoration error is greater than or equal to the reference value.

In the apparatus, the detection neural network may include an encoder configured to calculate a latent value from the input value without dimension reduction; and a decoder configured to calculate the restored value from the latent value without dimension expansion.

The apparatus may further include a learning unit configured to initialize the detection neural network, input a training input value to the initialized detection neural network, when an encoder of the detection neural network calculates an uncompressed latent value from the training input value, and a decoder of the detection neural network calculates the restored value from the latent value, to calculate a loss that is a difference between the restored value and the training input value, and perform optimization of updating a parameter of the detection neural network to minimize the loss.

In the apparatus, when learning on the detection neural network is completed, the detection unit may be configured to calculate the reference value in accordance with Equation $\theta=\mu+(k\times\sigma)$, wherein $\mu$ denotes an average of a mean squared error (MSE) between a plurality of training input values and a plurality of restored values corresponding to the plurality of training input values used for learning on the detection neural network, σ denotes a standard deviation of the MSE between the plurality of training input values and the plurality of restored values corresponding to the plurality of training input values, and k is a weight for the standard deviation.

In the apparatus, the data processing unit may be configured to extract a plurality of mel-spectrograms by applying a sliding window having a predetermined time length to the noise, to generate a plurality of feature vectors by compressing each of the plurality of mel-spectrograms with mel-frequency cepstral coefficient (MFCC) according to a time average, and to generate the input value by combining the plurality of feature vectors into a feature vector matrix.

The present invention provides an apparatus and method capable of detecting an anomaly by calculating a restored value from an input value without dimension reduction/expansion in a detection neural network. According to the present invention, because a single detection apparatus can be used for all devices with sound or noise, it can be applied to a more general and wide range of users. That is, by performing a convolution operation without dimension reduction/expansion, time-series information processing capability is improved and computational efficiency is increased. Moreover, the detection apparatus can be used for a plurality of different kinds of products, and allows an anomaly detection without domain knowledge, thereby reducing operating manpower and cost.

DETAILED DESCRIPTION

Figure 1:
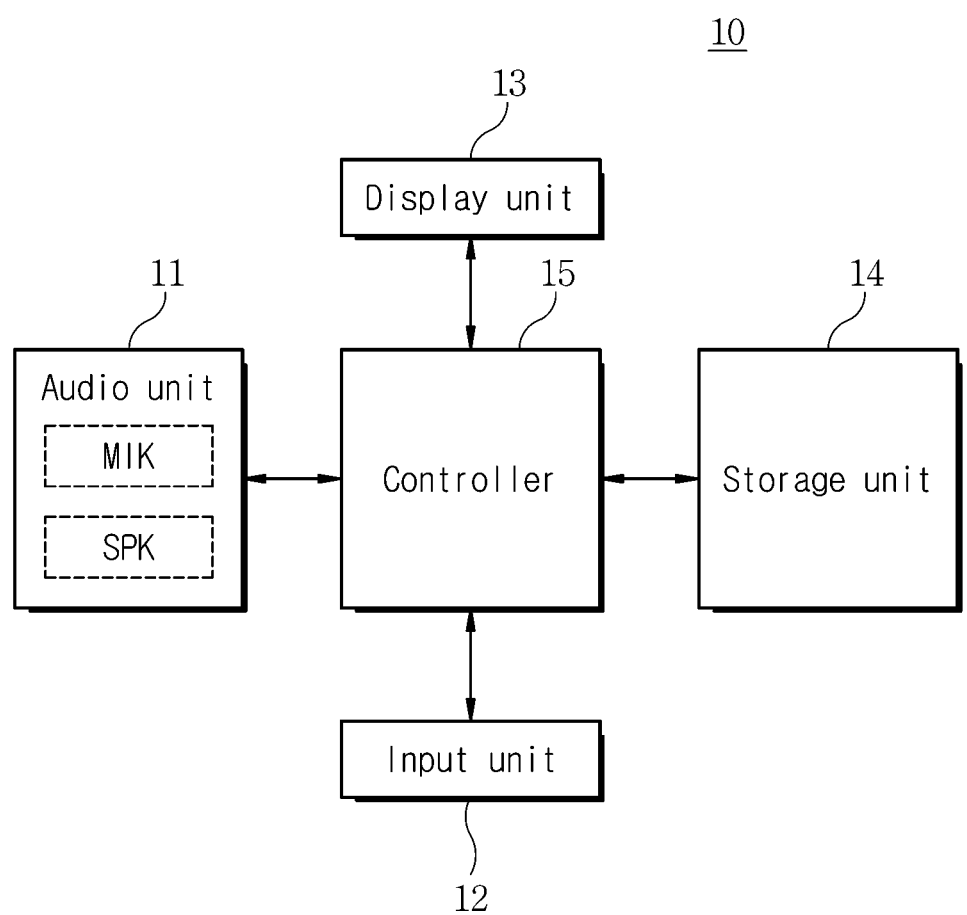
FIG. 1 is a block diagram illustrating the configuration of a sound anomaly detection apparatus based on a non-compression convolutional neural network according to an embodiment of the present invention.

In order to clarify the characteristics and advantages of the technical solution of the present invention, the present invention will be described in detail through specific embodiments of the present invention with reference to the accompanying drawings.

However, in the following description and the accompanying drawings, well known techniques may not be described or illustrated to avoid obscuring the subject matter of the present invention. Through the drawings, the same or similar reference numerals denote corresponding features consistently.

The terms and words used in the following description, drawings and claims are not limited to the bibliographical meanings thereof and are merely used by the inventor to enable a clear and consistent understanding of the invention. Thus, it will be apparent to those skilled in the art that the following description about various embodiments of the present invention is provided for illustration purpose only and not for the purpose of limiting the invention as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements.

Further, when it is stated that a certain element is "coupled to" or "connected to" another element, the element may be logically or physically coupled or connected to another element. That is, the element may be directly coupled or connected to another element, or a new element may exist between both elements.

In addition, the terms used herein are only examples for describing a specific embodiment and do not limit various embodiments of the present invention. Also, the terms "comprise", "include", "have", and derivatives thereof refer to inclusion without limitation. That is, these terms are intended to specify the presence of features, numerals, steps, operations, elements, components, or combinations thereof, which are disclosed herein, and should not be construed to preclude the presence or addition of other features, numerals, steps, operations, elements, components, or combinations thereof.

In addition, the terms such as "unit" and "module" used herein refer to a unit that processes at least one function or operation and may be implemented with hardware, software, or a combination of hardware and software.

In addition, the terms "a", "an", "one", "the", and similar terms are used herein in the context of describing the present invention (especially in the context of the following claims) may be used as both singular and plural meanings unless the context clearly indicates otherwise.

Also, embodiments within the scope of the present invention include computer-readable media having computer-executable instructions or data structures stored on computer-readable media. Such computer-readable media can be any available media that is accessible by a general purpose or special purpose computer system. By way of example, such computer-readable media may include, but not limited to, RAM, ROM, EPROM, CD-ROM or other optical disk storage, magnetic disk storage or other magnetic storage devices, or any other physical storage medium that can be used to store or deliver certain program codes formed of computer-executable instructions, computer-readable instructions or data structures and which can be accessed by a general purpose or special purpose computer system.

In the description and claims, the term "network" is defined as one or more data links that enable electronic data to be transmitted between computer systems and/or modules. When any information is transferred or provided to a computer system via a network or other (wired, wireless, or a combination thereof) communication connection, this connection can be understood as a computer-readable medium. The computer-readable instructions include, for example, instructions and data that cause a general purpose computer system or special purpose computer system to perform a particular function or group of functions. The computer-executable instructions may be binary, intermediate format instructions, such as, for example, an assembly language, or even source code.

In addition, the disclosure may be implemented in network computing environments having various kinds of computer system configurations such as PCs, laptop computers, handheld devices, multiprocessor systems, microprocessor-based or programmable consumer electronics, network PCs, minicomputers, mainframe computers, mobile phones, PDAS, pagers, and the like. The disclosure may also be implemented in distributed system environments where both local and remote computer systems linked by a combination of wired data links, wireless data links, or wired and wireless data links through a network perform tasks. In such distributed system environments, program modules may be located in local and remote memory storage devices.

Figure 2:
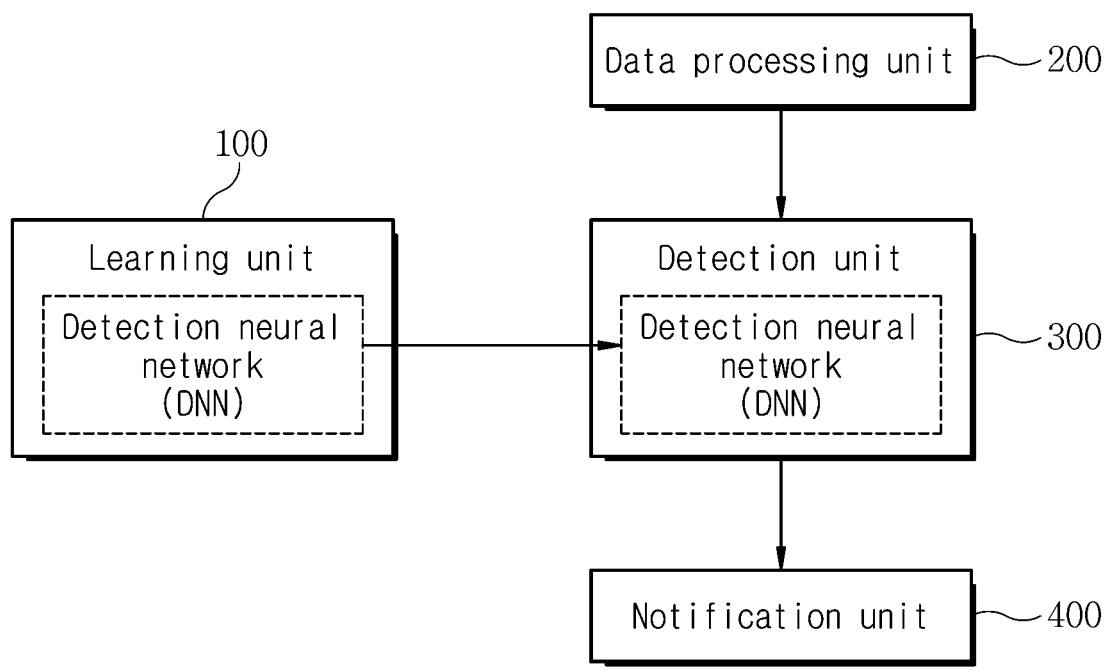
FIG. 2 is a block diagram illustrating the detailed configuration of a sound anomaly detection apparatus based on a non-compression convolutional neural network according to an embodiment of the present invention.

At the outset, the configuration of a sound anomaly detection apparatus based on a non-compression convolutional neural network according to an embodiment of the present invention will be described. FIG. 1 is a block diagram illustrating the configuration of a sound anomaly detection apparatus based on a non-compression convolutional neural network according to an embodiment of the present invention. FIG. 2 is a block diagram illustrating the detailed configuration of a sound anomaly detection apparatus based on a non-compression convolutional neural network according to an embodiment of the present invention.

Referring to FIG. 1, a detection apparatus 10 according to an embodiment of the present invention includes an audio unit 11, an input unit 12, a display unit 13, a storage unit 14, and a controller 15.

The audio unit 11 includes a microphone MIK for collecting an audio signal, such as a sound, which is a medium of anomaly detection according to an embodiment of the present invention. That is, the audio unit 11 transmits a sound inputted through the microphone MIK, for example, an audio signal such as noise, to the controller 15. Also, the audio unit 11 further includes a speaker SPK for outputting an audio signal. The audio unit 11 may output an audio signal through the speaker SPK under the control of the controller 15.

The input unit 12 receives a user's key manipulation for controlling the detection apparatus 10, generates an input signal, and transmits the generated input signal to the controller 15. The input unit 12 may include at least one of a power on/off key, a numeral key, and a direction key, and may be formed as a predetermined function key on one side of the detection apparatus 10. When the display unit 13 is made of a touch screen, the functions of various keys of the input unit 12 may be performed on the display unit 13. If all of such functions can be performed only with the touch screen, the input unit 12 may be omitted.

The display unit 13 visually provides a user with a menu of the detection apparatus 10, input data, function setting information, and other various kinds of information. The display unit 13 outputs various screens such as a booting screen, an idle screen, and a menu screen of the detection apparatus 10. The display unit 13 may be formed of a liquid crystal display (LCD), an organic light emitting diode (OLED), an active matrix organic light emitting diode (AMOLED), or the like. Meanwhile, the display unit 13 may be implemented as a touch screen. In this case, the display unit 13 may include a touch sensor, and the controller 15 may sense a user's touch input through the touch sensor. The touch sensor may be formed of a touch sensing sensor of a capacitive overlay type, a pressure type, a resistive overlay type, or an infrared beam type, or may be formed of a pressure sensor. In addition to the above sensors, all kinds of sensor devices capable of sensing contact or pressure of an object may be used as the touch sensor of the present invention. The touch sensor senses a user's touch input, generates a sensing signal, and transmits it to the controller 15. The sensing signal may include coordinate data of a user's touch input. When the user inputs a touch position movement motion, the touch sensor may generate a sensing signal including coordinate data of a touch position movement path and transmit it to the controller 15.

The storage unit 14 stores programs and data necessary for the operation of the detection apparatus 10, and may be divided into a program area and a data area. The program area may store a program for controlling the overall operation of the detection apparatus 10, an operating system (OS) for booting the detection apparatus 10, an application program, and the like. The data area may store data generated in response to the use of the detection apparatus 10. Also, the storage unit 14 may store various types of data generated in response to the operation of the detection apparatus 10.

The controller 15 may control the overall operation of the detection apparatus 10 and the signal flow between internal blocks of the detection apparatus 10, and perform a data processing function. The controller 15 may be a central processing unit (CPU), an application processing unit (APU), an accelerated processing unit (APU), a graphic processing unit (GPU), a neural processing unit (NPU), or the like.

Referring to FIG. 2, the controller 15 includes a learning unit 100, a data processing unit 200, a detection unit 300, and a notification unit 400.

The learning unit 100 is configured to perform learning (deep learning) on a detection neural network DNN that is a deep learning model DLM according to an embodiment of the present invention. The detection neural network DNN that completes learning is used in the detection unit 300.

The data processing unit 200 generates, from noise received from the audio unit 11, an input value that is a feature vector matrix including a plurality of feature vectors. The generated input value is inputted to the detection unit 300.

The detection unit 300 is configured to analyze the noise converted into the input value through the learning-completed detection neural network DNN and thereby detect an anomaly or not in an inspection target that emits the noise.

When the detection unit 300 detects an anomaly in the inspection target, the notification unit 400 outputs a warning sound through the speaker SPK of the audio unit 11 and outputs a warning message through the display unit 13.

The operation of the controller 13 including the learning unit 100, the data processing unit 200, the detection unit 300, and the notification unit 400 will be described in more detail below.

Figure 3:
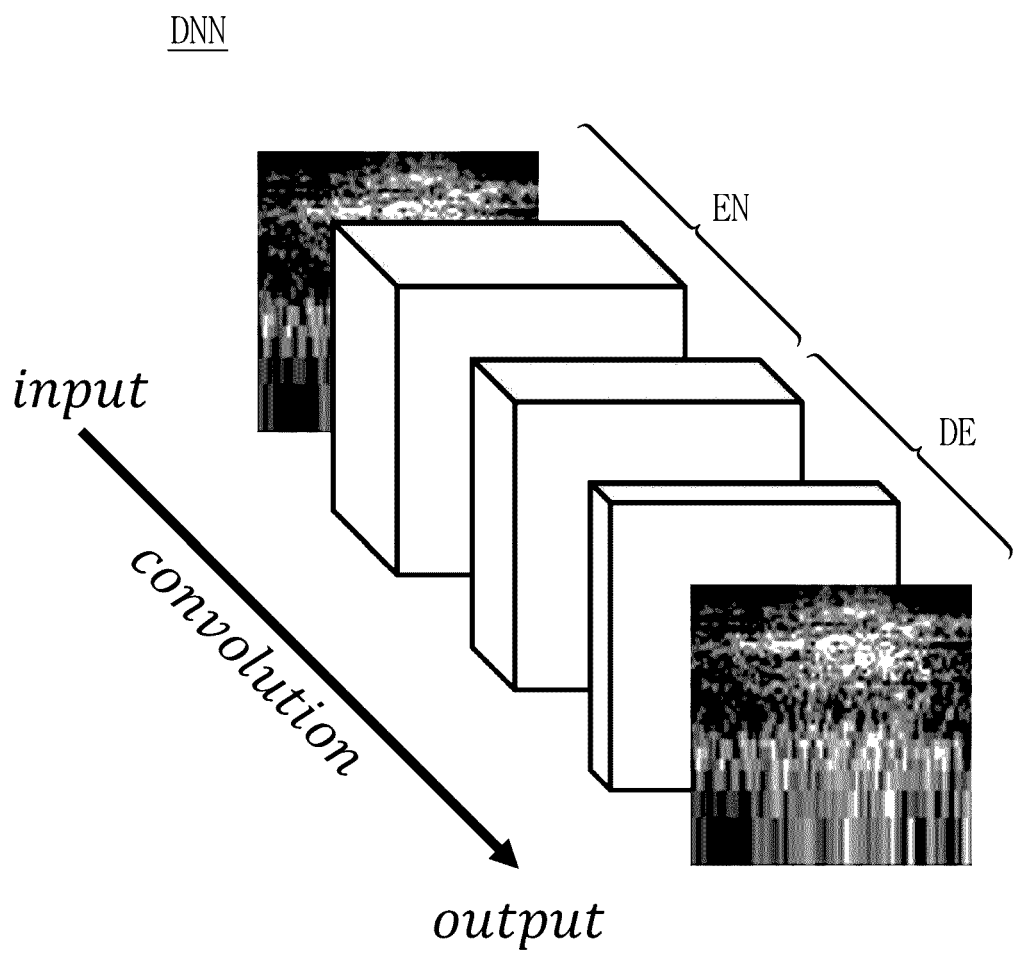
FIG. 3 is a diagram illustrating the configuration of a detection neural network according to an embodiment of the present invention.

Next, the configuration of a detection neural network DNN according to an embodiment of the present invention will be described. FIG. 3 is a diagram illustrating the configuration of a detection neural network according to an embodiment of the present invention. Referring to FIG. 3, the detection neural network DNN includes an encoder EN and a decoder DE.

The detection neural network DNN including the encoder EN and the decoder DE includes a plurality of layers, which include a plurality of operations. In addition, the plurality of layers are connected by a weight. A calculation result of one layer is weighted and then becomes an input of a node of the next layer. That is, one layer of the detection neural network DNN receives a weighted value from the previous layer, performs an operation on it, and transfers the operation result to the input of the next layer.

When an input value (x) is inputted, the encoder EN performs a plurality of operations in which a plurality of inter-layer weights are applied to the input value (x) without dimension reduction, thereby computing and outputting a latent value (z) that is a latent vector. The decoder DE performs a plurality of operations in which a plurality of inter-layer weights are applied to the latent value (z) without dimensional expansion, thereby generating a restored value (x'). That is, the input value is a feature vector matrix including a plurality of feature vectors, and is two-dimensional data (the number of elements of the feature vector X the number of feature vectors). If a layer such as a fully connected layer is used, the dimension may be reduced from 2D to 1D. However, the present invention generates the latent value (z) and the restored value (x') from the input value (x) without such dimension reduction.

The encoder EN includes an enlarge layer (EL) and at least one convolution layer (CL). A pooling layer (PL) may be further included between the convolutional layers of the encoder EN. The decoder DE includes at least one convolution layer (CL). A pooling layer (PL) may be further included between the convolutional layers of the decoder DE.

The enlarge layer generates a feature map with a size enlarged than the input value in order to perform an operation on the input value (x) without dimension reduction. The convolution layer generates a feature map by performing a convolution operation and an operation by an activation function. The pooling layer generates a feature map by performing a max pooling operation.

The feature map generated by the last layer of the encoder EN is the latent value (z), and the feature map generated by the last layer of the decoder DE is the restored value (x').

Figure 4:
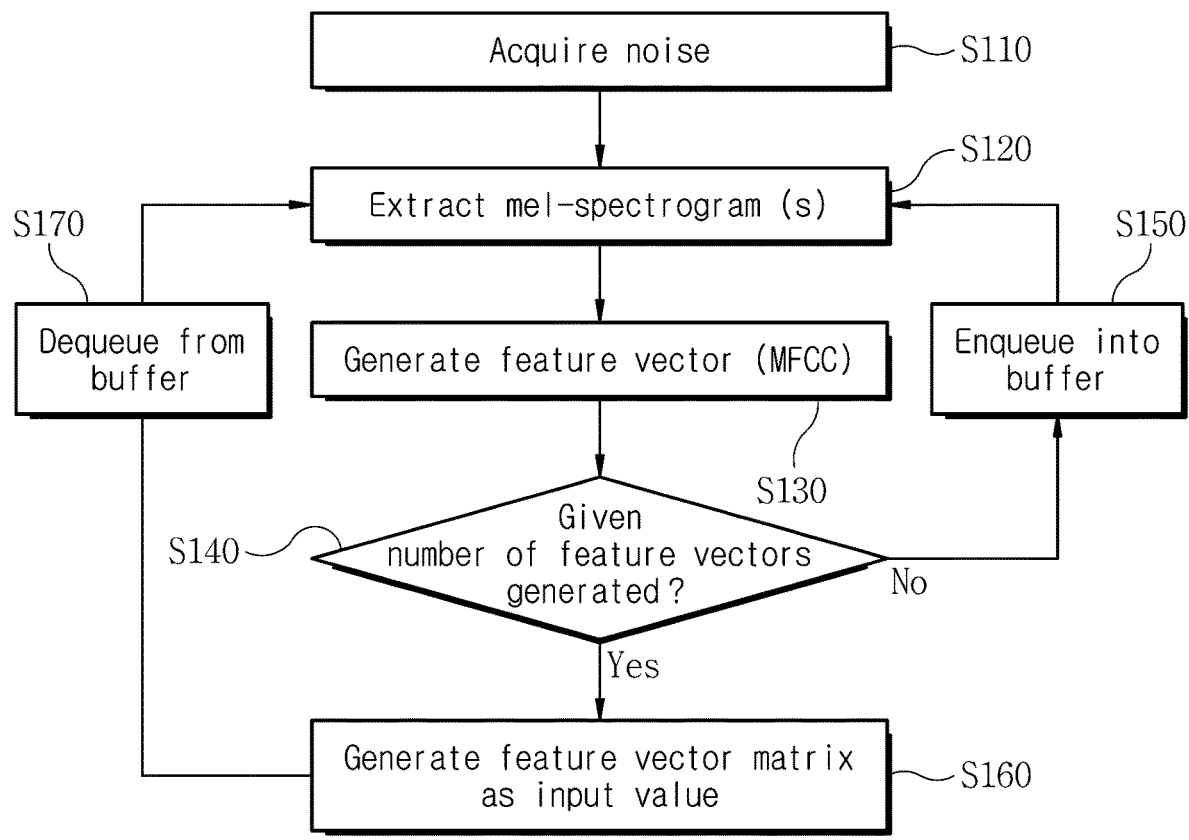
FIG. 4 is a flowchart illustrating a method of generating an input value according to an embodiment of the present invention.
Figure 5:
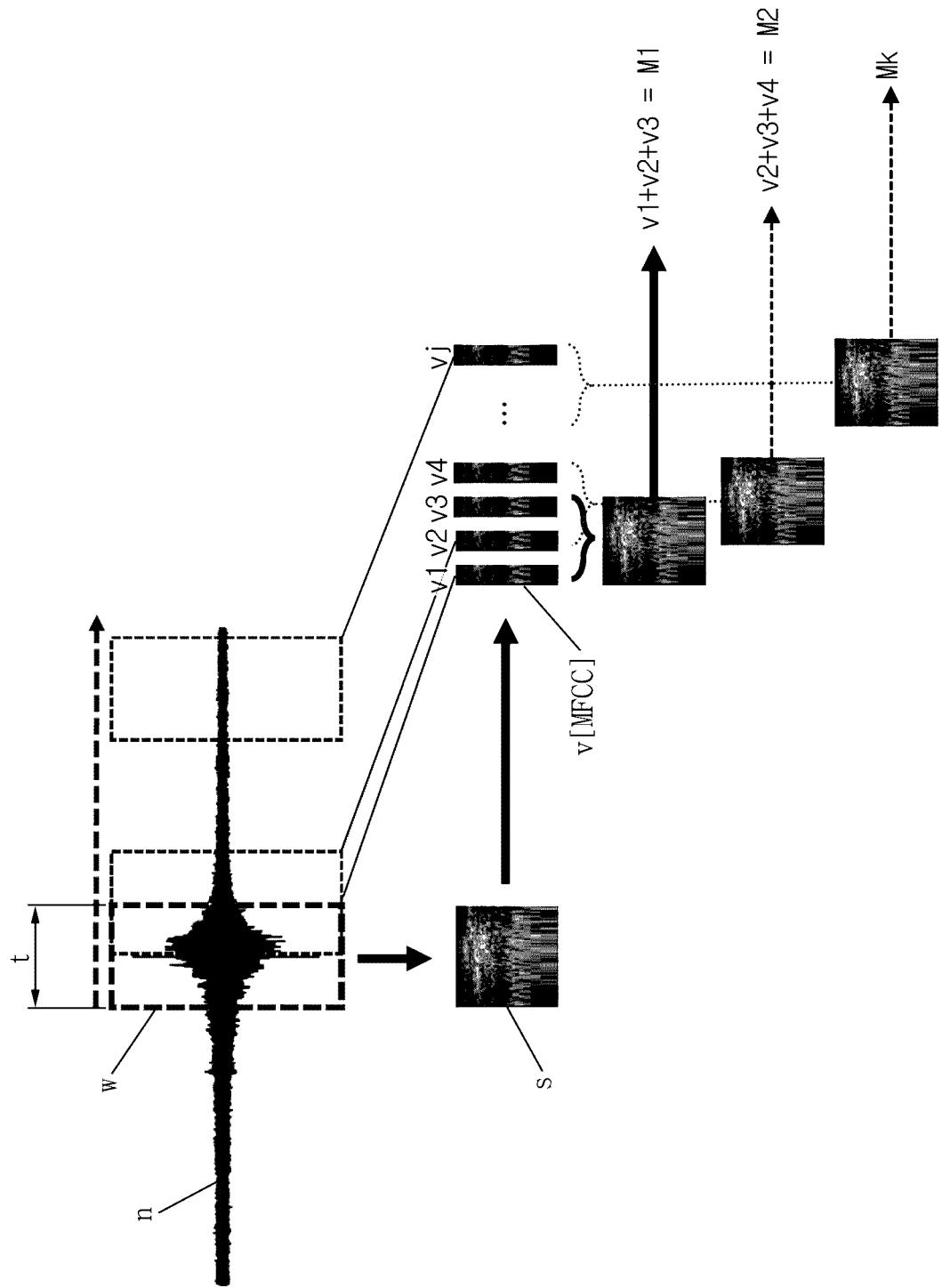
FIG. 5 is a diagram illustrating a method of generating an input value according to an embodiment of the present invention.

Next, a method of generating an input value according to an embodiment of the present invention will be described. FIG. 4 is a flowchart illustrating a method of generating an input value according to an embodiment of the present invention. FIG. 5 is a diagram illustrating a method of generating an input value according to an embodiment of the present invention.

Referring to FIGS. 4 and 5, at step S110, the audio unit 11 acquires a noise generated from an inspection target through the microphone MIC and provides it to the data processing unit 200 of the controller 15. Here, the noise generated from the inspection target may be, for example, a noise generated from an engine of a vehicle, a noise generated by friction between wheels of a vehicle and a road surface while the vehicle is running, a noise generated from a production facility in a factory, a noise generated from a home appliance such as a noise generated from the rear of a refrigerator, or the like.

At step S120, the data processing unit 200 applies a sliding window (w) having a predetermined time length (t) (e.g., 20-40 ms) to the noise (n) continuously inputted through the audio unit 11, and extracts a mel-spectrogram(s) indicating the intensity and frequency distribution of the noise (n) according to the mel-scale in units of the sliding window (w).

Then, at step S130, the data processing unit 200 calculates a time average for the extracted mel-spectrogram(s), and generates a feature vector (v) by compressing the mel-spectrogram(s) with mel-frequency cepstral coefficient (MFCC).

At step S140, the data processing unit 200 determines whether a predetermined number of feature vectors (v) are generated to form a feature vector matrix. For example, it is assumed that the feature vector matrix consists of three feature vectors (v).

If it is determined at the step S140 that the predetermined number of feature vectors (v) are not generated, the data processing unit 200 proceeds to step S150 and enqueues the generated feature vector (v) into a buffer. Here, the buffer has the same size as the number (e.g., three) of the feature vectors (v) constituting the feature vector matrix. The buffer is a queue-type buffer, and the first inputted feature vector (v) is dequeued first.

On the other hand, if it is determined at the step S140 that the predetermined number of feature vectors (v) are generated, the data processing unit 200 proceeds to step S160 and generates a feature vector matrix (M) by combining the predetermined number of generated feature vectors (v) in a matrix form. For example, as shown in FIG. 5, a first feature vector matrix (M1) is generated by sequentially combining three feature vectors, that is, first, second, and third feature vectors (v1, v2, and v3).

Next, at step S170, the data processing unit 200 dequeues the first enqueued feature vector from the buffer. For example, if the first feature vector matrix (M1) is generated by sequentially combining three feature vectors (v1, v2, and v3), the first feature vector (v1) is dequeued.

Then, the above-described steps S120 to S160 are repeated. Accordingly, for example, as shown in FIG. 5, a new feature vector, that is, a fourth feature vector (v4) is generated, and a second feature vector matrix (M2) is generated by combining three feature vectors, that is, the second, third, and fourth feature vectors (v2, v3, and v4).

As described above, the generated feature vector matrix (M) is provided as an input value (x) to the detection unit 300.

Figure 6:
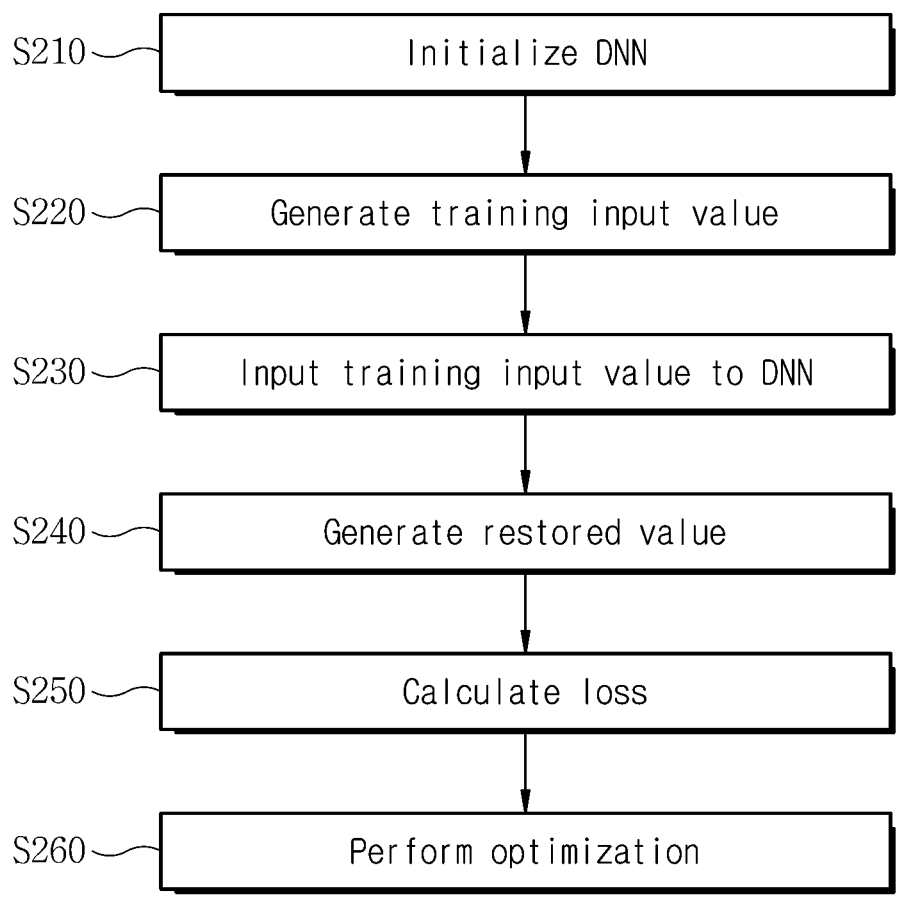
FIG. 6 is a flowchart illustrating a learning method for a detection neural network for sound anomaly detection according to an embodiment of the present invention.

Next, a sound anomaly detection method based on a non-compression convolutional neural network according to an embodiment of the present invention will be described. The non-compression convolutional neural network according to an embodiment of the present invention is a detection neural network (DNN). Thus, a learning method for the detection neural network which is the non-compression convolutional neural network for sound anomaly detection according to an embodiment of the present invention will be described. FIG. 6 is a flowchart illustrating a learning method for a detection neural network for sound anomaly detection according to an embodiment of the present invention.

Referring to FIG. 6, at step S210, the learning unit 100 initializes a detection neural network (DNN). At this time, the learning unit 100 initializes a parameter of the detection neural network (DNN), that is, a weight (w). For initialization, the Xavier initializer may be used.

When the initialization is completed, the learning unit 100 prepares at step S220 an input value (x) used for training, that is, a training input value (x), to the initialized detection neural network (DNN). In an embodiment of the present invention, the training input value (x) refers to a feature vector matrix generated from noise (n) generated by an inspection target when the inspection target is normal. The training input value (x) is generated in the same method as the input value (x) previously described with reference to FIGS. 4 and 5.

Next, at step S230, the learning unit 100 inputs the training input value (x) to the initialized detection neural network (DNN).

Then, at step S240, the detection neural network (DNN) generates a restored value (x') imitating the training input value (x) by performing a plurality of operations in which a plurality of inter-layer weights are applied. In more detail, the encoder (EN) of the detection neural network (DNN) performs a plurality of operations in which a plurality of inter-layer weights are applied to the training input value (x), and thereby calculates a latent value (z) for the training input value (x) without dimension reduction. In addition, the decoder (DE) of the detection neural network (DNN) performs a plurality of operations in which a plurality of inter-layer weights are applied to the latent value (z) calculated by the encoder (EN), and thereby calculates the restored value (x') without dimensional expansion.

Then, at step S250, the learning unit 100 calculates a loss according to the following Equation (1).

$$\mathcal{L} = |x - D(E(x)| = |x - x'| \qquad (1)$$

In Equation 1, E( ) represents the operation of the encoder (EN), and D( ) represents the operation of the decoder (DE). Also, L in Equation 1 represents a loss. The loss L represents a difference between the training input value (x) and the restored value (x').

Next, at step S260, the learning unit 100 performs optimization of updating the weight (w) of the detection neural network (DNN) through a back-propagation algorithm in order to minimize the loss.

The above-described steps S220 to S260 may be repeatedly performed until the total loss calculated using a plurality of different training input values (x) is less than or equal to a predetermined target value.

Figure 7:
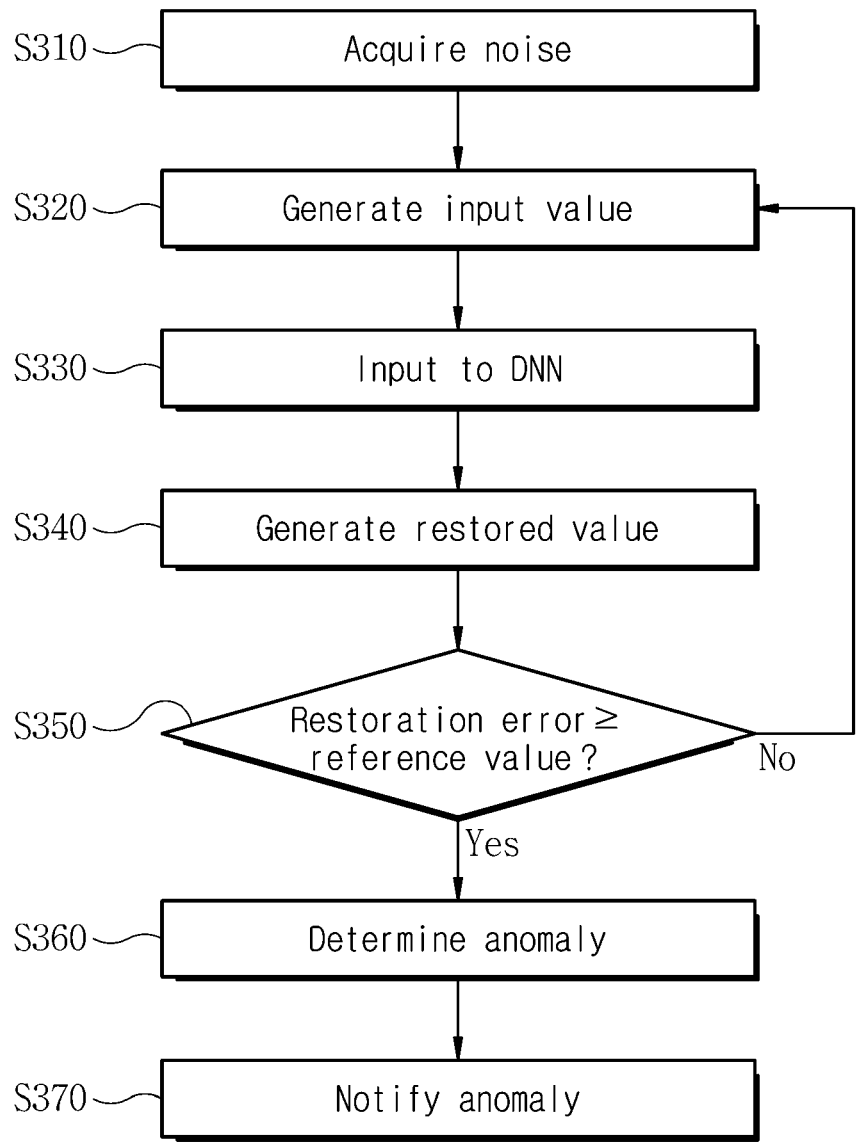
FIG. 7 is a flowchart illustrating a sound anomaly detection method based on a non-compression convolutional neural network according to an embodiment of the present invention.

When the learning on the detection neural network (DNN) is completed in accordance with the above-described procedure, it is possible to detect an anomaly by using the detection neural network (DNN). This method will be described. FIG. 7 is a flowchart illustrating a sound anomaly detection method based on a non-compression convolutional neural network according to an embodiment of the present invention.

Referring to FIG. 7, at step S310, the audio unit 11 continuously acquires a noise generated from an inspection target through the microphone MIC and provides it to the data processing unit 200 of the controller 15. Then, at step S320, the data processing unit 200 generates an input value (x) from the acquired noise (n).

As described with reference to FIGS. 4 and 5, the data processing unit 200 sequentially extracts a plurality of mel-spectrograms(s) from the noise (n) in units of the sliding window (w), and generates a plurality of feature vectors (v: v1, v2, v3, v4, . . . vj) by compressing the extracted mel-spectrograms(s) with MFCC. Then, the data processing unit 200 forms a feature vector matrix by combining a predetermined number of feature vectors (v) and thereby generates an input value (x).

At step S330, the detection unit 300 inputs the input value (x) to the detection neural network (DNN). Then, at step S340, the detection neural network (DNN) generates a restored value (x') imitating the input value (x) through a plurality of operations in which a plurality of inter-layer weights are applied to the input value (x). That is, the encoder (EN) calculates a latent value (z) from the input value (x) without dimension reduction by performing a plurality of operations in which a plurality of inter-layer weights are applied to the input value (x), and the decoder (DE) calculates a restored value (x') from the latent value (z) without dimensional expansion by performing a plurality of operations in which a plurality of inter-layer weights are applied.

At step S350, the detection unit 300 determines whether a restoration error, which indicates a difference between the input value (x) and the restored value (x') as shown in Equation (2), is greater than or equal to a reference value (θ) determined according to Equation (3)

$$\|x - x'\| \geq \theta \qquad (2)$$

$$\theta = \mu + (k \times \sigma) \qquad (3)$$

In Equations 2 and 3, θ represents a reference value. In Equation 2, x denotes an input value and x' denotes a restored value. In Equation 3, μ and σ respectively denote the average and standard deviation of the mean squared error (MSE) between a plurality of training input values (x) and a plurality of restored values (x') corresponding to the plurality of training input values (x) used in the above-described learning procedure with reference to FIG. 6, that is, used for learning on the detection neural network (DNN). In addition, k is a weight for the standard deviation σ, and 1.5 to 3 may be applied. Therefore, when the learning is completed, the detection unit 300 calculates the reference value θ and stores it in the storage unit 14. In addition, using Equation 2, the detection unit 300 determines whether the restoration error is greater than or equal to the calculated reference value θ.

If it is determined at the step S350 that the restoration error is greater than or equal to the reference value θ, the detection unit 300 determines that there is an anomaly in the inspection target at step S360. As the detection unit 300 determines that there is an anomaly in the inspection target, the notification unit 400 notifies the detected abnormal state at step S370 by outputting a warning sound through the audio unit 11 and outputting a warning message through the display unit 13.

According to the present invention, because a single detection apparatus can be used for all devices with sound or noise, it can be applied to a more general and wide range of users. For example, the detection apparatus 10 of the present invention can be additionally installed even if a new product does not have an anomaly detection function, such as the vehicle including no road surface condition detection function as an ADAS option. In particular, according to the present invention, an anomaly detection result can be notified by a warning sound or an interlocked device.

While an RNN-based method reflects only forward causality based on the time axis, the present invention based on CNN can additionally reflect backward causality as well. Moreover, the non-compression auto-encoder structure makes possible to reduce the weight of a model. That is, time-series information processing capability is improved, and computational efficiency is increased.

One detection apparatus 10 can be installed in a plurality of products without selectively purchasing an anomaly detection function option for each product. Moreover, since a user without domain knowledge can install and operate the detection apparatus 10, it is possible to reduce manpower and cost required for the on-site inspection service.

While the specification contains many specific implementation details, these should not be construed as limitations on the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

Certain embodiments of the subject matter of the present invention have been described hereinabove. Other embodiments are also within the scope of the following claims. For example, acts recited in the claims may be performed in a different order and still achieve desirable results. As an example, the processes depicted in the accompanying drawings do not necessarily require the specific illustrated order or sequential order to achieve desirable results. In certain implementations, multitasking and parallel processing may be advantageous.

This description shows the best mode of the present invention and provides examples to illustrate the present invention and to enable a person skilled in the art to make and use the present invention. The present invention is not limited by the specific terms used herein. Based on the above-described embodiments, one of ordinary skill in the art can modify, alter, or change the embodiments without departing from the scope of the present invention.

Accordingly, the scope of the present invention should not be limited by the described embodiments and should be defined by the appended claims.

What is claimed is:

1. A sound anomaly detection method comprising:
acquiring, by an audio unit, a noise from an inspection target;
generating, by a data processing unit, an input value that is a feature vector matrix including a plurality of feature vectors from the noise;
generating, by a detection unit, a restored value imitating the input value through a detection neural network that is a deep neural network learned for the input value;
determining, by the detection unit, whether a restoration error indicating a difference between the input value and the restored value is greater than or equal to a calculated reference value; and
determining, by the detection unit, that there is an anomaly in the inspection target when determining that the restoration error is greater than or equal to the reference value,
wherein generating the restored value includes:
calculating, by an encoder of the detection neural network, a latent value from the input value without dimension reduction, and
calculating, by a decoder of the detection neural network, the restored value from the latent value without dimension expansion.

2. The method of claim 1, further comprising:
before acquiring the noise from the inspection target,
initializing, by a learning unit, the detection neural network;
inputting, by the learning unit, a training input value to the initialized detection neural network;
calculating, by an encoder of the detection neural network, an uncompressed latent value from the training input value;
calculating, by a decoder of the detection neural network, the restored value from the latent value;
calculating, by the learning unit, a loss that is a difference between the restored value and the training input value; and
performing, by the learning unit, optimization of updating a parameter of the detection neural network to minimize the loss.

3. The method of claim 1, further comprising:
before acquiring the noise from the inspection target, and after completing learning on the detection neural network,
calculating, by the detection unit, the reference value in accordance with Equation $\theta=\mu+(k\times\sigma)$,
wherein $\mu$ denotes an average of a mean squared error (MSE) between a plurality of training input values and a plurality of restored values corresponding to the plurality of training input values used for learning on the detection neural network,
wherein $\sigma$ denotes a standard deviation of the MSE between the plurality of training input values and the plurality of restored values corresponding to the plurality of training input values, and
wherein k is a weight for the standard deviation.

4. The method of claim 1, wherein generating the input value includes:
extracting, by the data processing unit, a plurality of mel-spectrograms by applying a sliding window having a predetermined time length to the noise;
generating, by the data processing unit, a plurality of feature vectors by compressing each of the plurality of mel-spectrograms with mel-frequency cepstral coefficient (MFCC) according to a time average; and
generating, by the data processing unit, the input value by combining the plurality of feature vectors into a feature vector matrix.

5. A sound anomaly detection apparatus comprising:
an audio unit configured to acquire a noise from an inspection target;
a data processing unit configured to generate an input value that is a feature vector matrix including a plurality of feature vectors from the noise; and
a detection unit configured to:
generate a restored value imitating the input value through a detection neural network that is a deep neural network learned for the input value, the detection neural network comprising:
an encoder configured to calculate a latent value from the input value without dimension reduction, and
a decoder configured to calculate the restored value from the latent value without dimension expansion, determine whether a restoration error indicating a difference between the input value and the restored value is greater than or equal to a calculated reference value, and determine that there is an anomaly in the inspection target when determining that the restoration error is greater than or equal to the reference value.

6. The apparatus of claim 5, further comprising:

a learning unit configured to:

initialize the detection neural network, input a training input value to the initialized detection neural network, when an encoder of the detection neural network calculates an uncompressed latent value from the training input value, and a decoder of the detection neural network calculates the restored value from the latent value, calculate a loss that is a difference between the restored value and the training input value, and perform optimization of updating a parameter of the detection neural network to minimize the loss.

7. The apparatus of claim 5, wherein when learning on the detection neural network is completed, the detection unit is configured to calculate the reference value in accordance with Equation $\theta=\mu+(k\times\sigma)$, wherein $\mu$ denotes an average of a mean squared error (MSE) between a plurality of training input values and a plurality of restored values corresponding to the plurality of training input values used for learning on the detection neural network, wherein $\sigma$ denotes a standard deviation of the MSE between the plurality of training input values and the plurality of restored values corresponding to the plurality of training input values, and wherein k is a weight for the standard deviation.

8. The apparatus of claim 5, wherein the data processing unit is configured to:

extract a plurality of mel-spectrograms by applying a sliding window having a predetermined time length to the noise, generate a plurality of feature vectors by compressing each of the plurality of mel-spectrograms with mel-frequency cepstral coefficient (MFCC) according to a time average, and generate the input value by combining the plurality of feature vectors into a feature vector matrix.

* * * * *